C. F. HOOFER.
PNEUMATIC LUBRICATING SYSTEM FOR LUBRICATING THE FLANGES OF TRACK VEHICLE WHEELS.
APPLICATION FILED MAY 28, 1917.

1,278,657.

Patented Sept. 10, 1918.
5 SHEETS—SHEET 5.

WITNESSES:
E. L. Proctor
E. E. Hoofer

INVENTOR
Charles Frederick Hoofer

UNITED STATES PATENT OFFICE.

CHARLES FREDERICK HOOFER, OF SEATTLE, WASHINGTON, ASSIGNOR TO HOOFER MANUFACTURING COMPANY, A CORPORATION OF WASHINGTON.

PNEUMATIC LUBRICATING SYSTEM FOR LUBRICATING THE FLANGES OF TRACK VEHICLE-WHEELS.

1,278,657.

Specification of Letters Patent.   Patented Sept. 10, 1918.

Application filed May 28, 1917.   Serial No. 171,566.

*To all whom it may concern:*

Be it known that I, CHARLES FREDERICK HOOFER, a citizen of the United States, and a resident of Seattle, in the county of King and the State of Washington, United States of America, have invented new and useful Improvements in Pneumatic Lubricating Systems for Lubricating the Flanges of Track-Vehicle Wheels, of which the following is a specification.

This invention relates to wheel flange lubricators of the type disclosed in my prior Patent No. 1,054,550, dated February 25, 1913. The object of my present invention being to provide a simple, effective, reliable and inexpensive device, and it consists in the constructions, combinations and arrangements herein described and claimed.

The object of my invention being to provide automatic means, whereby a predetermined supply of oil may be positively delivered at intermittent intervals, to the wheel flanges of track vehicle wheels.

Another object of my invention is to provide an intermittent flow of air under pressure, through the oil passages, thereby reducing to a minimum any stoppage which might occur therein.

A further object of my invention is to provide a novel form of oil retainer and dispenser combined, having means for regulating the quantity of oil dispensed.

A further object of my invention is to provide a novel form of wheel flange oil distributer.

A still further object of my invention is to provide a novel form of air pressure control device.

Other objects and advantages will appear in the following specifications, and the novel features of the device will be particularly pointed out in the appended claims.

My invention is illustrated in the accompanying drawings forming part of this application in which.

Figure 1:
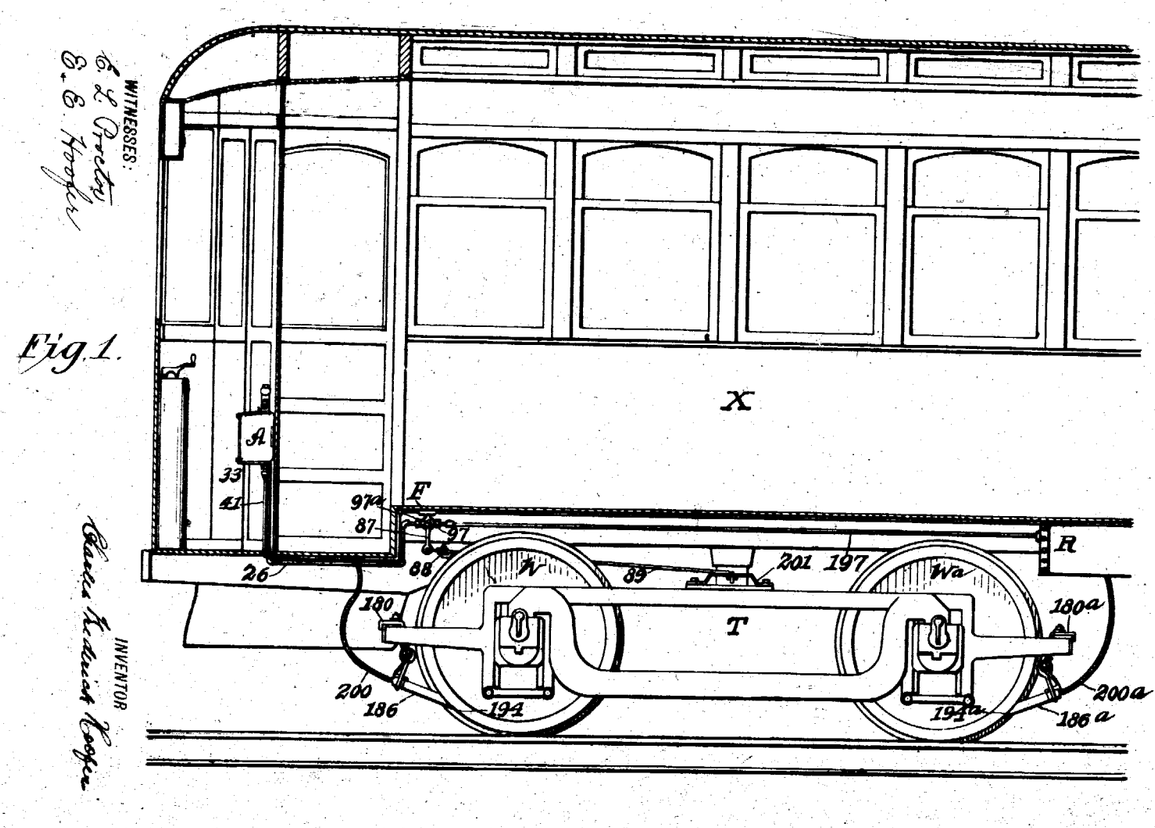
Figure 1 is a sectional view in side elevation, of a portion of the body of a street car, mounted on a truck, showing one form of my invention as applied thereto.
Figure 2:
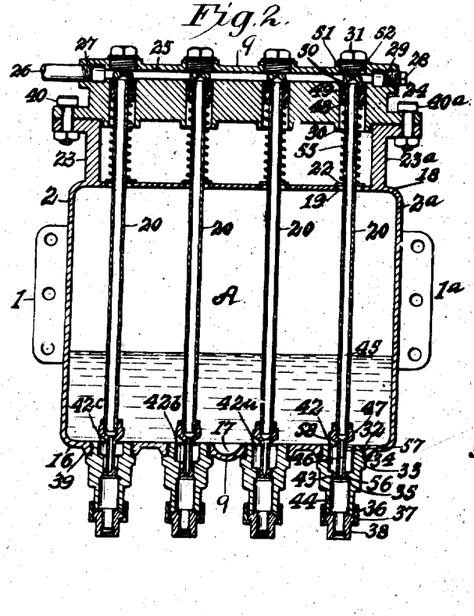
Fig. 2 is a section through one of the oil dispensers, along the line 8—8 of Fig. 3.
Figure 3:
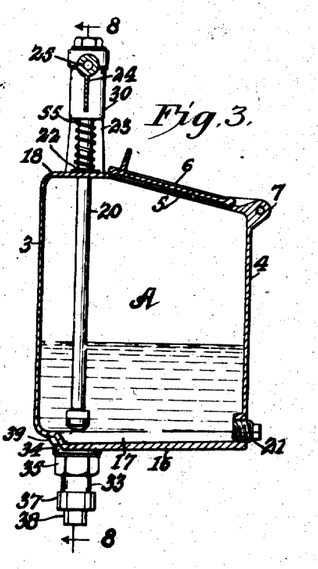
Fig. 3 is a section along the line 9—9 of Fig. 2.
Figure 4:
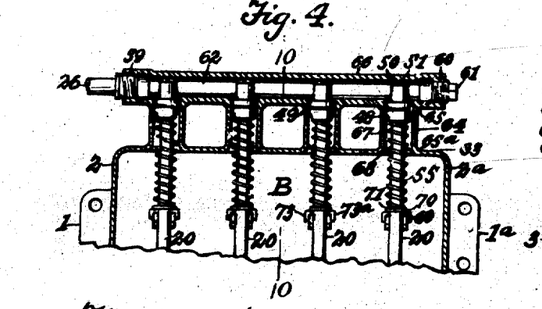
Fig. 4 is a section through the top portion of a modified form of oil dispenser, along the line 11—11 of Fig. 5.
Figure 5:
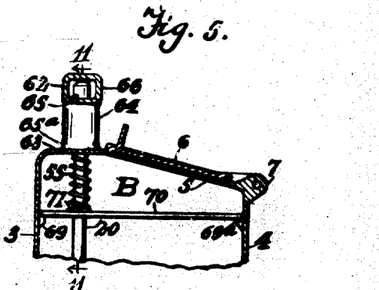
Fig. 5 is a section along the line 10—10 of Fig. 4.

In carrying out my invention I provide oil dispensers like that shown at A, in Figs. 1, 2, and 3, also like that shown at B, in Figs. 4 and 5. The dispensers may be made of any suitable material, but preferably of cast brass or iron, and they consist of attaching lugs 1 and 1ª extending outward, and at right angles to the side walls 2 and 2ª, and on a longitudinal plane with the back wall 3, a front wall 4 being not as high as the back wall 3, provides a downward slope in a portion of the top 5, a cover 6, hinged to the lug 7, covers the opening through which the dispenser may be filled and the mechanism assembled within the main reservoir.

The horizontal portion of the top 18 is provided near its edges adjacent the side walls 2 and 2ª, with upward projecting integral L shaped lugs 23 and 23ª suitable for having attached thereto (by means of bolts 40 and 40ª) a cylinder saddle 24, bearing a plurality of cylinders 30.

The horizontal bottom 16 is provided with a plurality of threaded openings 32, having downward projecting embossments 39, adapted to receive the threaded ends of the dispensing nipples 33. A downward convexity 17 adapted for draining the contents of the oil receptacle is normally closed by the plug 21. In general contour the oil retainer or reservoir is oval at its edges.

The cylinder saddle 24 is provided with a passage 25 extending longitudinally therethrough, being in communication with an inlet pipe 26 through the threaded opening 27, its end opposite is provided with a threaded opening 29 to which pipe connections may be arranged to supply air pressure to other dispensers, but normally the opening 29 is closed by the plug 28 when no further connection is desired. The passage 25 is in communication with the plurality of cylinders 30, within each of which is disposed one end of a tubular piston stem 20, being provided with a piston head 48, a packing leather 49 and a follower cap 50. The piston stems 20 extend through the oil retainer and are provided at their lower end with an elongated double-conoid-headed plunger 47. A groove 52 and a vent 51 is provided in the follower cap 50, also a passage 45 through the stem 20 and a passage 46 through the double-conoid-headed plunger 47.

Each of the dispensing nipples 33 is exteriorly threaded from its top end to a shoulder 34, from thence it extends in the form of a convenient hexagon 35 and terminates in an integral nipple 36, being threaded for receiving the union 37 and connecting the nipple 38, which is also exteriorly hexagoned and interiorly threaded for receiving the pipe 41. The interior of each of the dispensing nipples 33 is provided with a cylindrical aperture 42 tapered at its top edge, and communicating at its bottom end with another cylindrical aperture 43 which is of smaller diameter, having both ends tapered, and in turn communicating with still another cylindrical aperture 44, having its outlet in the nipple 38, and the pipe 41.

Each of the elongated double-conoid-headed plungers 47 is interiorly threaded from the top end for receiving the threaded end of the stem 20, the lower side of the head 58 is tapered to form a joint with its seat in the bottom of the aperture 42, an integral extension 57 terminating at its lower extremity in the head 56, being tapered at its top edge and adapted to the aperture 43.

It is thus seen that the upper chamber 42 of the dispensing nipple and the head 58 of the plunger 47, form respectively a cylinder and its piston of a positive acting oil feed pump to insure the uniform discharge of an exact quantity of oil, this amount being determined by the capacity of the cylinder chamber 42.

Figure 6:
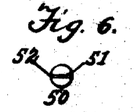
Fig. 6 is a top plan view of a piston follower cap, shown in Fig. 2.
Figure 7:
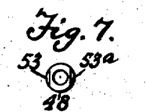
Fig. 7 is a bottom plan view of a piston head, shown in Fig. 2.
Figure 8:
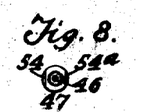
Fig. 8 is a top plan view of an elongated double conoid headed plunger, shown in Fig. 2.
Figure 9:
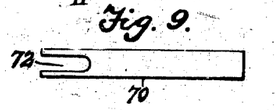
Fig. 9 is a top plan view of a spring support shown in Fig. 5.
Figures 10, 11, 12:
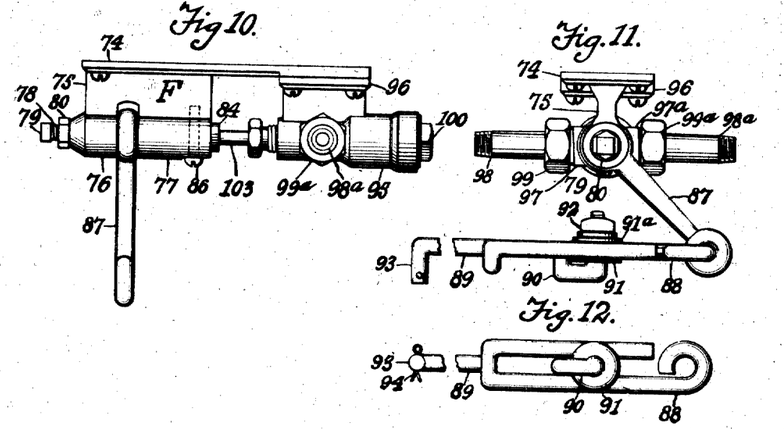
Fig. 10 is a view of an air pressure control device F, shown in side elevation.
Fig. 11 is a view of the air pressure control device F, in front elevation, also showing an adjustment feature of the operating rod.
Fig. 12 is a bottom plan view of an adjustment feature of an operating rod, shown in Fig. 11.
Figures 13, 14, 15:
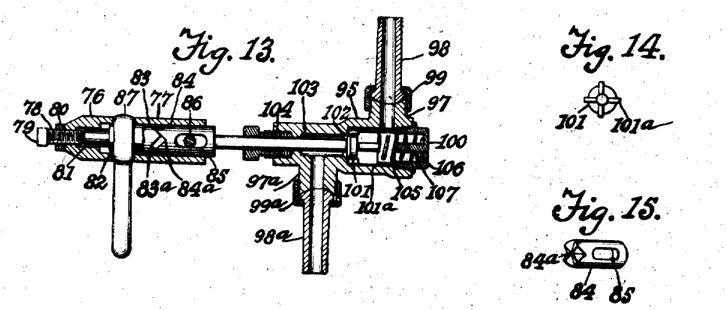
Fig. 13 is a central section of the air pressure control device F, with the operating mechanism shown in top elevation.
Fig. 14 is a back plan view of an air valve, shown in Fig. 13.
Fig. 15 is a detail perspective view of the zigzag end of one of the co-portions of the operating shaft.
Figures 16, 17, 18:
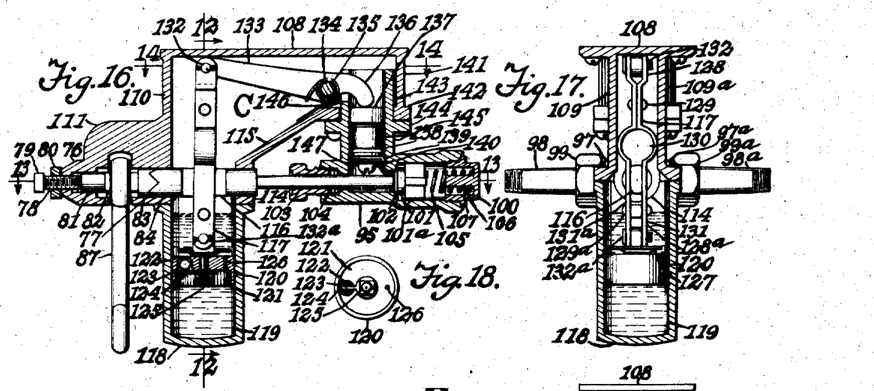
Fig. 16 is a central section of the modified form of air pressure control device C, with the operating mechanism shown in side elevation.
Fig. 17 is a section along the line 12—12 of Fig. 16, with part of the operating mechanism shown in front elevation.
Fig. 18 is a bottom plan view of the automatic cut-off plunger head, shown in Fig. 16.

Washers or disks 22, comparatively loose fitting upon the plunger stems 20, and lying over the openings 19, serve as supports for the springs 55, which in turn are adapted for holding the plunger piston stems 20 normally in their uppermost positions with the follower caps 50 resting against the lower side of the screw-caps 31, for convenience in assembling the various parts upon the plunger piston stems 20, the follower caps 50 are provided with a groove 52 (see Fig. 6), for inserting a screw driver or other similar tool, also a further purpose of the groove 52 is to provide an opening to the vent 51 when the follower cap 50 is normally resting against the lower side of the screw-cap 31. The head 48 has cut-away portions 53 and 53ª forming a convenient head for applying a wrench (see Fig. 7), also the elongated double-conoid-headed plunger 47 has cut-away portions 54 and 54ª for applying a wrench (see Fig. 8).

In the modified form of oil dispenser B, shown in Figs. 4 and 5, it is understood that the parts which are not shown, are identical to the corresponding parts shown in Figs. 2 and 3.

The horizontal portion of the top 63 is provided with a plurality of upward projecting integral cylinders 64, each being joined at its upper end to an integral oblong extension 66, and having fillets 65 and 65ª surrounding them at their extremities. The oblong extension 66 is provided with a passage 62 extending longitudinally therethrough, and communicating with an inlet pipe 26 through the threaded opening 59, at its opposite end it is provided with the threaded opening 60 to which pipe connections may be arranged to supply air pressure to other oil dispensers; but normally the opening 60 is closed by the plug 61 when no further connection is desired. The upward extending cylindrical extensions 64 are provided with cylindrical apertures 67 extending longitudinally therethrough, and communicating with the passage 62 at their top ends, their bottom ends terminating in the tapered edges 68, which are open to the interior of the oil retainer or reservoir.

The back wall 3 and the front wall 4 have a plurality of inward projecting lugs 69 and 69ª adapted for carrying the spring supports 70, upon which the washers 71 form supports for the springs 55 which in turn bear against the lower side of the piston heads 48 normally holding the plunger stems 20 in their uppermost positions with their follower caps 50 resting against the lower side of the top wall of the passage 62, the piston heads 48 and the packing leathers 49 being disposed within the cylinders 67. By removing one of the bars 70 the corresponding oil feeding mechanism is thrown out of use, as the oil feeding piston remains permanently in its cylinder.

The spring supports 70 are provided with an open ended slot 72, the edges 73 and 73ª are downward projecting flanges, which provide convenient means for holding them in place upon their respective lugs 69 and 69ª.

In Figs. 10 to 15 inclusive, I have shown an air pressure control device F. This consists of an attaching plate 74, having at one end a downward extension 75, bearing an integral cylindrical conoid adjustment socket 76, and an open ended cylindrical shaft bearing 77, having reciprocally mounted therein the shaft 84, the inner end of this shaft being provided with a zigzag end 84ª, also one end of the co-portion 83 is reciprocally mounted therein, with its zigzag end 83ª in engagement with the zigzag end 84ª. The integral conoid adjustment socket 76 is provided with a threaded opening through one end for receiving the adjustment screw 78, while its opposite end forms a socket, having pivoted therein the spindle end 81 of the shaft member 83. Means for engaging the zigzag ends 83ª and 84ª are provided in the adjustment screw 78, having a head 79 and a lock nut 80. The shaft 84 is provided with a slot 85, through which is mounted the guide pin 86, within the cylindrical shaft bearing 77. Each of the zigzag ends 83ª and 84ª are identical in form, and may be described as an end of a cylindrical body, quartersectioned into tetrahedral pyramidal projections, with their vertexes circumjacent to the center, and their bases forming the circumference (see Fig. 15).

The shaft member 83 has a non-circular portion 82 upon which is loosely mounted a lever 87, being guided in its position between the ends of the socket 76 and the shaft bearing 77. The opposite end of the lever 87 being linked to an adjustment loop 88, which is in turn attached to the operating rod 89 by means of its curved end 90, washers 91 and 91ª and the adjustment nut 92. The opposite end of the rod 89 is also provided with a curved end 93, an opening therein for receiving a split key 94 by means of which the same may be pivoted to any suitable form of lug on the truck frame T.

An air pressure valve casing 95, is provided with an attaching plate 96, adapted to be attached to the extended end of attaching plate 74. The casing 95 is provided with an inlet through an integral nipple 97, coupled to the nipple 98 by the union 99, and an outlet through an integral nipple 97ª, coupled to the nipple 98ª by the union 99ª. A screw-cap 100 having a cylindrical aperture 106 for housing the end of a spring 105, which is mounted upon an integral projection or spring boss 107 therein. An air valve 101 having radial guide members 101ª, is normally held upon its seat 102 by means of the spring 105. A stem 103 having one end bearing against the valve 101, extends out of the casing 95 through a packing gland 104 and terminates in engagement with the shaft member 84.

It is evident that turning of shaft member 83 through the swinging of lever arm 87, will act through the engagement of the inclined facets 83ª and 84ª, to displace valve 101 from its seat and admit air to the pipe 98ª.

In Figs. 16 to 21 inclusive, I have shown a modified form of air pressure control device G, having an automatic cut-off feature, additional to the features embodied in the air pressure control device F, as set forth with reference to Figs. 10 to 15 inclusive.

In carrying out this purpose I have designed a dust-proof casing, having an oblong attaching plate 108 forming a top wall thereof, and extending downward therefrom are the sides 109 and 109ª, also an end wall 110 having an outward extension 111 bearing an integral conoid adjustment socket 76 and a cylindrical shaft bearing 77. The bottom of the casing is provided with an opening between the cylindrical shaft bearing 77 and the annular shaft bearing 114, this opening is surrounded by a lateral flange 112 adapted to have attached thereto (by means of screws or stud-bolts) a similar flange 113, bearing a cylindrical extension or dash-pot 119 having a bottom 118. From the edge of the lateral flange 112 the bottom 115 is inclined to the edge of a similar flange 142, which surrounds an opening in the bottom of a cylindrical enlargement 141.

and the cylindrical enlargement 141 forms an oval end wall of the casing.

The air pressure valve casing 95 is provided with an integral open ended cylindrical extension 143 at right angles thereto, and bearing intermediate its ends an integral lateral rectangular flange 144 adapted to be secured to the flange 142 by means of screws or stud-bolts, the open ended cylindrical aperture 147, having its source in the valve casing 95 and its opposite end open to permit the end of a piston 137 coming in contact with the curved end 136 of a fulcrum lever 133, an open ended slot 146, extending downward from the top end of the cylindrical extension 143 serves as a guide for the lever 133. The piston 137 is provided with a leather packing head 139 secured thereto by means of the screw-cap and washer 140, a chamber 138 is formed surrounding it intermediate its ends, which is in communication with the atmosphere through the vent 145, the purpose being for discharging such air pressure as may leak past the head 139.

The dash-pot 119 is provided with a plunger head 120, having a cylindrical aperture in its bottom face 121, communication through the plunger head 120 is provided by the frusto-conical aperture 122 and the restricted passage or vent 126, the frusto-conical aperture 122 having a ball 123 disposed therein which serves as a check valve, a small cross-bar 124 arranged diametrically across the lower opening holds the ball 123 in its position, the cross-bar 124 is secured by means of the follower bolt 125 passing through an eye formed in one end thereof. A tapering deflector disk 127 extends over the upper openings of the apertures 122 and 126 and is secured by means of the follower bolt 125 passing therethrough.

A connecting rod 117 constructed of two parallel bars secured to each other by means of stays or rivets 129 and 129ª forming a pair of parallel guides 131 and 131ª which open into a circular enlargement 130 formed intermediate the ends of the rod 117, the end 128ª being pivoted to the plunger head 120 by means of pin 132ª and the follower bolt 125, the end opposite being pivoted to the fulcrum lever 133 by means of a pin 132. The fulcrum lever 133 is carried by the fulcrum pin 134, secured in the side walls 109 and 109ª. A spring 135 carried by the fulcrum pin 134 is arranged to hold the various operative parts in the position shown in Fig. 16.

The shaft member 84, is provided with an oblong portion 116, adapted to be engaged between the parallel guides 131 and 131ª, and is rotatively mounted in the cylindrical shaft bearing 77 and the annular shaft-bearing 114.

The mechanism relative to the shaft members 83 and 84, also the valve casing 95 has been fully described in the foregoing with reference to the air pressure control device F, and it is understood that the same general principle is also adopted in the modified form C, all the mechanism being virtually the same except such variations as may be readily understood.

Figure 22:
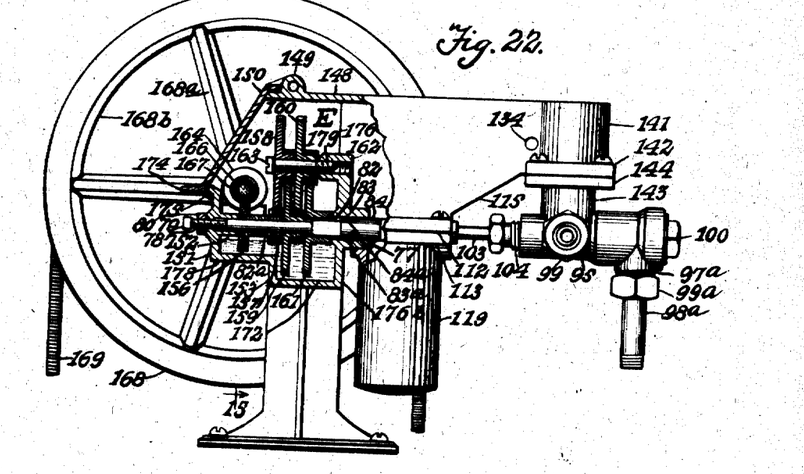
Fig. 22 is a view in side elevation partly in section, of the modified form of air pressure control device E, with part of the operating mechanism shown in side elevation.
Figure 23:
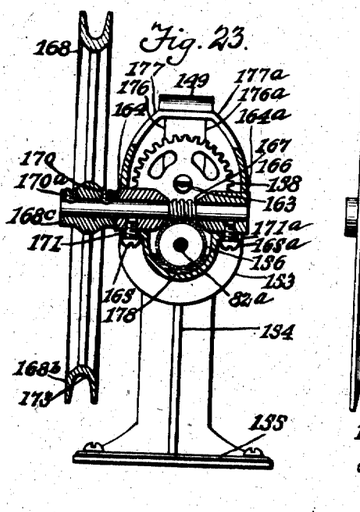
Fig. 23 is a sectional view of the main shaft and pulley, along the line 15—15 of Fig. 22, with part of the gear shown in front elevation.
Figure 24:
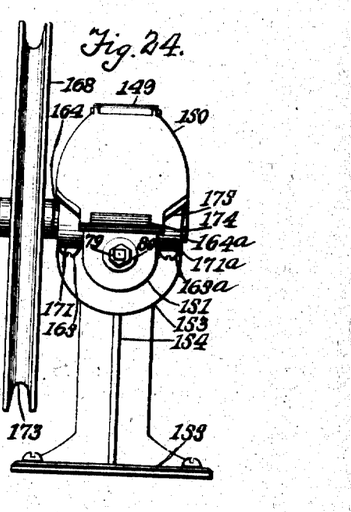
Fig. 24 is a perspective view of the modified form of air pressure control device E, in front elevation.

In Figs. 22 to 24 inclusive, I have shown another modified form of air pressure control device E, having a gear within a dust-proof gear box, adapted to be driven by a belt actuated by the axle of the vehicle truck, in addition to the features embodied in the air pressure control devices F and C as set forth with reference to Figs. 10 to 21 inclusive.

This device functions as a speed reducing mechanism and it is evident that another type of speed reducing mechanism may be substituted therefor.

A casing is provided having a top wall 148 and lateral end walls 176 and 176ª, also elliptical side walls 177 and 177ª forming a concaved bottom 172 bearing a radially tetra-flanged downward extension 154 terminating in a lateral foot or attaching plate 155. An end wall 153 bears a further longitudinal concaved extension 178, also having an end wall 151 with an outward tapering flange adapted to engage a similar flange 175 of the cover 150, which is hinged to the lug 149, the cover 150 is provided with a projection 174 convenient for lifting the same.

Circular openings through the elliptical sides 177 and 177ª at diametrically opposite points, form concaved bearing supports 171 and 171ª, having adjustably attached thereto (by means of screws passing through oblong slots 165 and 165ª) conoid-cylindrical bearings 164 and 164ª, through which is mounted a main shaft 166 having secured thereto (by means of stud-bolts 170 and 170ª) a main pulley 168 provided with radially tetra-flanged spokes 168ᵇ, a rim 168ᶜ, a groove 169 in the rim 168ᶜ and a hub 168ᵈ.

The cylindrical shaft bearing 77 intersects the center of the top edge of the wall 176ᵇ, and has an integral upward extending L shaped lug 162, a threaded opening extending longitudinally through the top arm of the lug 162 carries the threaded end of an axle 179, a head upon the axle 179 adapted to a screw driver or other similar tool.

Referring now to Fig. 22, it becomes obvious that the shaft member 83 is rotatively mounted with its zigzag end 83ª disposed within the shaft bearing 77, and its end opposite or spindle extension 82ª is carried in the adjustment socket 76. Means for engaging the zigzag ends 83ª and 84ª are provided by the adjustment screw 78 with its head 79 and the lock nut 80. A worm 167 is arranged to engage a worm-wheel 156 having an integral cog-pinion 157, which in turn engages the cog-wheels and pinions 158, 159, 160 and 161, the latter being reciprocally mounted on the rectangular portion 82, while all of the former are rotatively mounted on their respective spindle extension 82$^a$ or the axle 179, imparting thereby a rotative motion to the shaft member 83.

The mechanism relative to the air pressure valve 95, shaft members 83 and 84 and the automatic cut-off feature has been fully described in the foregoing with reference to the air pressure control devices F and C, and it is understood that the same general principle is incorporated in the modified form E, all the mechanism being virtually the same except such variations as may be readily understood.

Using this construction the member 83 is given a slow continuous rotation. By suitable adjustment of contact between the toothed end faces of this member and of the member 84, the air valve is intermittently opened at regular distances traveled to thus regularly supply oil to the flanges.

Referring now to Fig. 1, I have shown a portion of a street railway car, which I have denoted in general by X, the street railway car is provided with the usual air reservoir R, communication being established therewith through the pipe 197, inlet nipple 97, pressure control valve casing 95, outlet nipple 97$^a$ and the pipe 26 coupled to the air pressure portion of the oil dispensing mechanism.

Passages for oil and air pressure are provided through a plurality of pipes 41 each being connected to its respective dispensing nipple 33, flexible tubes 200 or 200$^a$ and the distributer shoes 186 or 186$^a$. Hanger supports 180 and 180$^a$ are secured to the truck frame, and are provided with a spring for yieldingly holding the discharge ends of the distributer shoes 186 and 186$^a$ in contact with the wheel flanges 194 and 194$^a$ of the wheels W and W$^a$ respectively.

The guide trucks T are connected by means of the rod 89 being pivoted to the lug strap 201, and the end opposite in turn being attached to an adjustment 88, which is linked to the lever 87 for operating the air pressure control device.

The oil containers or dispensers, consisting of the devices A and B, are of course supported stationary, but are not confined to any particular location. They may be placed in any position most convenient for filling the same, or in some cases they may be attached to the truck frame in close proximity to the wheel flanges to be oiled.

The air pressure control devices, consisting of the devices F, C and E, are supported stationary, but are not confined to any particular location. They may be placed in any convenient position under the car body, or, in some cases the form E may be placed inside of the car itself.

From the foregoing description of the various parts of the mechanism, the operation thereof may be readily understood.

A lubricating fluid is placed in the retainers through the opening in the top thereof. Normally the plunger stems 20 are held in upright position, like that shown in Fig. 2, thereby allowing the oil to pass into the apertures 42, 42$^a$, 42$^b$ and 42$^c$, it will not pass the conoid heads 56, because the latter are comparatively close fitting in the apertures 43. Now when the car is rounding a curve, the truck T will be turned so as to either pull or push on the lever 87 through the medium of the rod 89, thereby partially rotating the member 83 (see Fig. 13), its co-member 84 being guided by the pin 86 mounted through the slot 85, may not be thus rotated, but is subjected to a reciprocal movement when the relative positions of the zigzag ends 83$^a$ and 84$^a$ are moved out of alinement.

As the member 84 is thus forced against the stem 103, which in turn moves the valve 101 off its seat 102 against the tension of the spring 105, air pressure passes around the valve 101, through the outlet 97$^a$ and the pipe 26, into the air pressure portions of the oil dispensers A or B. Consider now the action of the air pressure, as it enters the plurality of cylinders 30 or 67 (as the case may be), it will press downward upon the heads of the plunger stems 20, moving them against the tension of the springs 55 so as to open the apertures 43, and enter the oil pump pistons 58 within their cylinders 42, 42$^a$, etc., and continuing until the lower faces of the pistons or plunger heads 58 are brought into contact with the tapered bottoms of their respective apertures 42, 42$^a$, 42$^b$ and 42$^c$, thus positively forcing the oil therein through the passages 43 and 44 into the pipes 41.

The oil which is best adapted for oiling wheel flanges is a heavy and viscous oil and will not flow quickly, especially if the passages are small. By introducing a positive force feed I secure an immediate delivery of the oil to the point where the discharged air may engage it and insure prompt carrying thereof to the wheel flange. Where a simple drainage discharge of the oil from the measuring chamber is employed, as in my previous patent mentioned, delivery of the oil to the wheel flange is delayed. The air pressure passing through the vents 51, passages 45 and 46 will cause the oil to be blown out upon the wheel flanges. In the mean time the movement of the plunger heads 58 has shut off the flow of oil from the retainer so that only a predetermined portion is forced out at each operation.

I desire to particularly call attention to the fact that the use of air discharged through the pump piston into the oil is not for the purpose of spraying the oil, but to act as a positive force to promptly convey the oil to the point of final delivery. The air supply opening is purposely kept so small that the volume of air supplied is insufficient to produce a spraying effect, but will fill the oil in the pipe with a mass of bubbles and also act as a piston to force the oil through the pipe.

Now when the straight portion of track is reached, and the truck T again returns to its normal position, the lever 87 will rotate the member 83 so as to bring its zigzag end 83$^a$ into alinement with its co-member 84$^a$, whereupon the spring 105 will reseat the valve 101 upon its seat 102, cutting off the air pressure from the air pressure portion of the oil retainers, the air pressure of course will continue to flow through the vents 51, passages 45 and 46 until the normal pressure is attained, whereupon the plunger stems 20 and their component parts will return to their initial positions by means of the springs 55, simultaneously withdrawing the plunger heads 58 from their respective apertures, also drawing back the heads 56 into the passages 43, cutting off the flow of oil therethrough, while another portion of oil may accumulate within the apertures 42, 42$^a$, 42$^b$ and 42$^c$ preparatory to the next lubricating operation.

In Fig. 2 it will be noticed that the apertures 42, 42$^a$, 42$^b$ and 42$^c$ are of various depths, which alters the capacity of each of the dispensing nipples 33, the object being to provide adjustable means for regulating the amount of oil dispensed. This is accomplished by providing interchangeable dispensing nipples 33 so that any set may be applied which dispense the amount of oil which may be desired.

It should also be understood that by removing the spring 55 from any of the plunger stems 20, it renders the same inoperative, so far as dispensing oil is concerned, so one or more of the oil dispensing mechanisms may be cut out at will, while the others may be in operation.

In further carrying out my invention, I have designed various modified forms of the mechanism, which may be essential under various conditions in successfully operating the device in general.

The modified form of oil dispenser B, is adapted to be more economical in construction, and more compact as to form. The operation of its mechanism is virtually the same as that described in the foregoing with reference to oil dispenser A (Figs. 2 and 3), except such variations as may be readily understood. The spring supports 70 being loosely mounted upon their respective lugs 69 and 69$^a$, may be conveniently removed at will, allowing the spring 55 to remain loosely upon its respective stem 20, thereby providing means for rendering any portion of the dispensing mechanism inoperative. In general contour the oil retainer or reservoir is oval at its edges, and is adapted to be interconnected with other dispensers, and operated in conjunction therewith.

Referring now to the modified form of air pressure control device C, this has an automatic cut-off feature in addition to the features embodied in the foregoing description with reference to the air pressure control device F. Normally the casing is held in upright position, the dash-pot or cylindrical extension 119 is normally charged to a depth well above the plunger head 120 with a liquid, preferably of an oily substance. The mechanism of the automatic cut-off feature is normally held in the position shown in Fig. 16, by means of the spring 135 being convoluted about the fulcrum pin 134, and having its central portion pressing upward under one arm of the fulcrum lever 133. The piston 137 which is arranged to engage the under side of the curved end 136 of the fulcrum lever 133 is not connected at either end, but normally rests with its follower screw 140 against the side of the stem 103.

Figures 19, 20, 21:
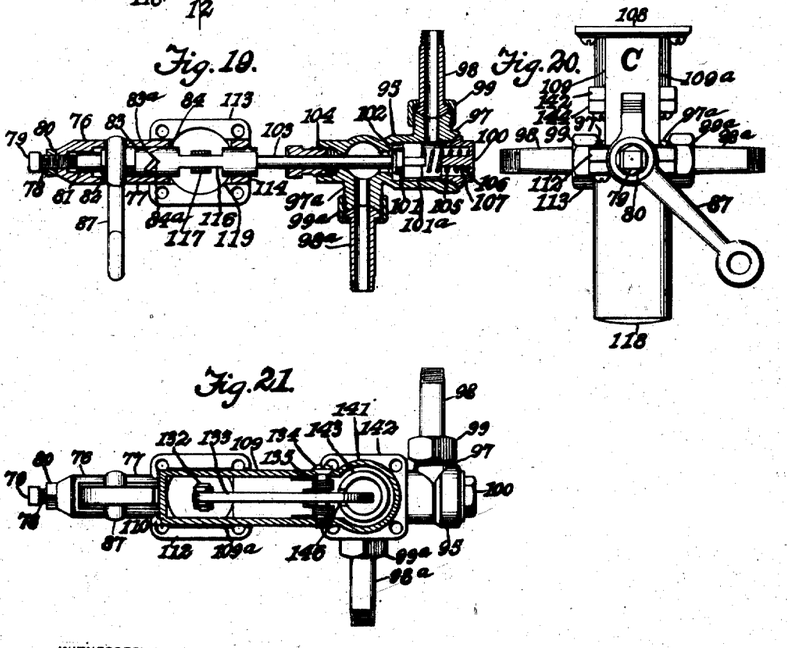
Fig. 19 is a section along the line 13—13 of Fig. 16, with the operating mechanism shown in top elevation.
Fig. 20 is a perspective view of the modified form of air pressure control device C, in front elevation.
Fig. 21 is a view in top elevation, partly in section, of the modified form of air pressure control device C, with part of the operating mechanism shown in top elevation.

Referring now to Fig. 19, it becomes obvious that the shaft member 83 may be subjected to a partially rotative movement in either direction by means of the lever 87, on the other hand its co-member 84 having its oblong portion 116 between the parallel guide members 131 and 131$^a$ may not be thus rotated, but is subjected to a reciprocal movement when the relative positions of the zigzag ends 83$^a$ and 84$^a$ are moved out of alinement, the member 84 being forced against the stem 103, which in turn forces the valve 101 off its seat 102, against the tension of the spring 105, allowing air pressure to pass around the valve 101. Consider now the action of the air pressure, as it enters upon its usual function through the outlet 97$^a$ (as fully described in the foregoing with reference to the oil dispensers A and B), it also enters into the aperture 147, pressing the piston 137 upward against the curved end 136 of the fulcrum lever 133, which in turn forces the plunger head 120 downward into the dash-pot 119, against the resistance of the spring 135, and the liquid in the bottom of the dash-pot 119.

The function of the plunger head 120 disposed in a dash-pot arrangement, is for the purpose of retarding the action of the automatic cut-off mechanism. To that end I have provided a small vent 126, through which the liquid below the plunger head 120 must pass. The frusto-conical aperture 122 being closed during a downward movement, by means of the ball check 123, the plunger head 120 and its component parts being thus moved gradually downward until the circular enlargement 130 of the connecting rod 117 registers with the oblong portion 116 of the shaft member 84, whereupon the member 84 (by means of the spring 105) immediately revolves itself to conform its zigzag end 84ª with the zigzag end 83ª, this movement simultaneously gives the member 84 a reciprocal movement, allowing the air pressure valve 101 to return to its seat 102 cutting off the air pressure.

When the normal air pressure is again attained below the head 139 by means of it having access to the atmosphere through the vents 51 (see Fig. 2), the fulcrum spring 135 immediately actuates a return movement of the automatic cut-off mechanism, but can not complete this movement until the oblong portion 116 is rotated into position to allow it to pass between the parallel guide members 131 and 131ª, this is accomplished when the guide trucks T reach a straight portion of the track, through the medium of the operating rod 89 actuating the lever 87.

It should be understood that the shaft member 83 is so adjusted (by means of the adjustment screw 78), that the spring 105 will press the zigzag ends 83ª and 84ª into engagement sufficiently to cause the shaft member 84 to be rotated by the shaft member 83, and when thus rotated to a certain position, the oblong portion 116 becomes engaged between the parallel guide members 131 and 131ª whereupon the automatic cut-off features complete their return movement, and immediately return to their initial positions, preparatory to the next operation. The prime object of this device being to provide means for automatically cutting off the air pressure after it having been applied a predetermined length of time, which feature is governed by the capacity of the vent 126, and the fluidity of the liquid used therein.

In the further modified form of air pressure control device E, I have provided a gear train within a dust-proof gear box, which is adapted to be self lubricating, and to that end the concaved bottom 172 and the concaved extension 178 are adapted to be charged with a lubricating oil to a depth well sufficient for the lubricant to become self distributing to the gear train. Normally the device may be attached to any suitable base, in an upright position as shown in Fig. 22. Through the opening covered by the cover 150, the gear train may be assembled within the gear box and fresh lubricant may be supplied when needed.

The main pulley 168 is adapted for being rotated in either direction by means of a belt 169, being engaged by a similar pulley mounted upon the axle of the car truck, an endless screw portion 167 of the shaft 166, conveys motion to the worm gear 156 having an elongated cog-pinion 157, which in turn conveys motion to the cog-wheel pinions 158, 159, 160 and 161, the latter being reciprocally mounted upon the rectangular portion 82 of the shaft member 83 thereby imparting a rotative motion to the same.

Referring now to Fig. 22, it becomes obvious that a rotative movement in either direction, of the shaft member 83 when the same is engaged with its co-portion or shaft member 84, will actuate the features of an air pressure control device such as that which has been fully described in the foregoing with reference to the modified form of air pressure control device C. Consider now the action of the shaft member 83 in relation with its co-member 84; as the former continuously revolves it carries with it the latter, and at diametrically opposite points in its course, the oblong portion 116 becomes engaged between the parallel guide members 131 and 131ª, whereupon the air pressure features are brought into operation, and thus actuated by air pressure the automatic cut-off mechanism accomplishes its function, whereupon the zigzag ends 83ª and 84ª again slip into alinement and are rotated into the position of engagement with the parallel guide members 131 and 131ª preparatory to the next operation, the length of intermittency between the operative intervals may be adjusted by means of changing the respective gears from one relative mesh to another.

The prime object of the device is to provide means whereby the wheel flanges of track vehicle wheels may be lubricated at regular intervals on straight track as well as on curves. It is also adapted for operating a pneumatic lubricating system upon cars of the single truck type, in which case the trucks are not arranged to swing under the car body, making the belt driven device more practical.

It is obvious that various modifications are within the scope and spirit of this invention, and I do not limit myself to the specific construction shown.

Having thus described my invention, what I claim as new and desire to secure by Letters Patent is:

1. A wheel flange oiling mechanism comprising a pump acting to positively deliver a measured quantity of oil, and means for applying air to deliver the oil from the pump to the flange.

2. A device as defined in claim 1 in which the air is supplied from behind the piston.

3. A wheel flange oiling mechanism comprising an air actuated piston and an oil pump piston connected together and suitable cylinders for said pistons, said pistons and their connecting member having an air passage connecting the working side of the air piston with the discharge side of the oil piston.

4. A wheel flange oiling mechanism comprising a positive action pump for delivering the oil, means for actuating the pump by compressed air and means for using compressed air in delivering the oil from the pump to the wheel flange.

5. A wheel flange oiling mechanism comprising a positive action pump for delivering the oil, means for actuating the pump by compressed air and means for using the air exhausted from the pump actuating mechanism to convey the oil to the wheel flange.

6. In a wheel flange oiling mechanism, an oil pump, a variable pump cylinder for adjustably varying the delivery capacity of the pump and means for conveying the oil from the pump to the wheel flange.

7. A device as in claim 6, employing compressed air to actuate the pump and air drawn from the pump actuating cylinder to convey the oil discharged to the wheel flange.

8. A device as in claim 6, employing compressed air to actuate the pistons.

9. A wheel flange oiling mechanism comprising an oil delivery pump having pistons, means for actuating said pistons, and detachable cylinders whereby the delivery capacity of any pump may be varied by applying thereto a cylinder having the proper effective length of bore.

10. A wheel flange oiler comprising an oil supply tank, an air cylinder and an oil cylinder located respectively at the upper and at the lower sides of the oil tank and in alinement with each other, air and oil pistons fitting each their respective cylinders, a rod connecting said pistons and having an air conveying passage, a valve controlling the oil discharge and carried from the oil piston, said valve and both pistons having air discharge passages connecting with that in their connecting rod to discharge air from the air cylinder to the discharge side of the valve.

11. In an oiling device, in combination, an oil reservoir having an opening in its bottom, a plug secured in said opening and having a bore containing an upwardly opening cylinder and a downward extension of reduced diameter, a pump piston adapted to said cylinder and having a stem extending in opposite directions therefrom, a plug valve carried by the downwardly extending stem and adapted to be drawn into the said downward extension when the pump piston is raised out of its cylinder, an air piston carried by the upward extension of said stem, an air cylinder receiving said air piston, said air and pump pistons, the valve and their connecting stems having an air discharging passage connecting the working side of the air piston with the discharge side of the valve.

12. In an oiling device, in combination, an oil reservoir having an opening in its bottom, a cylindrically bored plug secured in said opening, a pump piston adapted to fit the upper part of said bore and having a stem extending in opposite directions therefrom, a valve carried by the downward extension of said stem and adapted to close said bore when the pump piston is raised out of its cylinder, an air piston carried by the upward extension of said stem, an air cylinder receiving said air piston, said air and pump pistons, the valve and their connecting stems having an air discharging passage connecting the working side of the air piston with the discharge side of the valve, and means for positively limiting the discharge capacity of said pump piston.

13. In an oiling device, in combination, an oil reservoir having a series of openings in its bottom and a series of plugs interchangeably secured in said openings, each plug being cylindrically bored, the upper portion of this bore being of greater diameter than the lower and serving as a pump cylinder, a corresponding series of pump pistons adapted to fit said pump cylinders, valves adapted to seat in the lower portions of said bores, air cylinders alined with the pump cylinders, air pistons and a stem connecting the air pistons, pump pistons and the valves in sets, said parts each having an air discharge passage connecting the working side of its air piston with the discharge side of its valve.

14. In an oiling device, in combination, an oil reservoir, a series of air operated oil feed pumps having interchangeable pump cylinders of differing capacity, whereby the amount of oil supplied by each pump is determined by the active length of the pump cylinder employed.

15. In an oiling device, in combination, an oil reservoir, a series of air operated oil feed pumps having interchangeable pump cylinders of differing capacity, whereby the amount of oil supplied by each pump is determined by the active length of the pump cylinder employed, and means for discharging air with the oil.

16. In an oiling device, in combination, an oil storage tank, an oil pump cylinder opening upwardly into the bottom of the tank and having an axial downward discharge opening, a pump piston having a stem extending downwardly and a valve thereon adapted to close the discharge opening when the piston is above and out of its cylinder, a spring acting to seat said valve, and an air cylinder and a piston therein actuatively connected with the pump piston to act against said spring.

17. In an oiling device, in combination, an oil storage tank, an oil pump cylinder opening upwardly into the bottom of the tank and having an axial downward discharge opening, a pump piston having a stem extending downwardly and a valve thereon adapted to close said discharge opening when the piston is above and out of its cylinder, a spring acting to seat said valve, and an air cylinder and a piston therein actuatively connected with the pump piston to act against said spring, and means for controlling the stroke of said pump to thereby control the amount of the oil discharge.

18. In an oiling device, in combination, a positively acting oil feed pump, means for intermittently actuating said pump by air pressure, and means for discharging air with the oil.

19. In an oiling device, in combination, a positively acting oil feed pump having direct connected air actuated and oil feeding pistons, a spring for retracting the piston from its cylinder, means for intermittently supplying air to actuate the air piston, and means for discharging air with the oil.

20. In an oiling device, in combination, a positively acting oil feed pump having direct connected air actuated and oil feeding pistons, a spring for retracting the piston from its cylinder, means for intermittently supplying air to actuate the air piston, the pump pistons having an air discharge passage connecting the working face of the air piston with the discharge side of the pump.

21. In an oiling device, in combination, a reciprocative oil feed pump having an air cylinder, an oil cylinder, air and oil pistons, and a valve all connected together, means for automatically supplying air to the air cylinder of said pump, and time controlled means for automatically cutting off the air supply.

22. In a flange oiling device, in combination, a positively acting oil supply pump, time controlled means for actuating said pump by air, means actuated by the swing of a truck for supplying air to said pump, and means for automatically cutting off said air supply.

23. In a flange oiling device, in combination, an air actuated oil delivery mechanism, means actuated by the swing of a truck for supplying the air thereto, and means for automatically stopping the supply of actuating air a predetermined time after it has been applied.

24. In a flange oiling device, the combination with an air cylinder and piston for actuating the oil supply, of an auxiliary air cylinder and piston having a common supply with the main cylinder, an air supply cut-off actuated by the auxiliary piston, and a retarding mechanism acting to slow down the movement of said auxiliary piston.

25. In a pneumatic lubricating system for lubricating the flanges of track vehicle wheels, the combination of a source of compressed air, of an oil retainer, an air pressure control device, disposed between the said source of compressed air and the said oil retainer, pipe connections between the said source of compressed air and the said air pressure control device also between the said air pressure control device and the said oil retainer, an oil distributer, flexible pipe connections between the said oil retainer and the said oil distributer, an oil discharge mechanism carried by the said oil retainer adapted to be operated by compressed air, means for regulating the capacity of the said oil discharge mechanism, automatic means for intermittently actuating the operation of the said oil discharge mechanism, and also supplying a flow of air under pressure through the said flexible pipe connections between the said oil discharge mechanism and the said oil distributer.

26. In a pneumatic lubricating system for lubricating the flanges of track vehicle wheels, the combination of a source of compressed air, of an oil retainer, an air pressure control device disposed between the said source of compressed air and the said oil retainer, pipe connections between the said source of compressed air and the said air pressure control device, also between the said air pressure control device and the said oil retainer, an oil distributer, flexible pipe connections between the said oil retainer and the said oil distributer, an oil discharge mechanism carried by the said oil retainer adapted to be operated by compressed air, means for regulating the capacity of the said oil discharge mechanism, automatic means for actuating intermittently the functions of the said oil discharge mechanism and simultaneously supplying a current of air under pressure through the said flexible pipe connections between the said oil discharge mechanism and the said oil distributer, said automatic means comprising a lever arranged to operate the said air pressure control device, and means attached to the trucks of the vehicle for actuating said lever.

27. In a pneumatic lubricating system, the combination of a source of compressed air, an oil retainer, a plurality of air cylinders integral with the oil retainer, a corresponding plurality of openings in the bottom of the oil retainer, an oil discharge mechanism interchangeably secured in each of the openings, an air piston and plunger for discharging the oil having a passage for air extending therethrough, a plurality of springs for acting against the air pressure, removable supports for the springs whereby the oil discharge mechanisms may be thrown out of use, interchangeable oil discharge cylinders of various capacities whereby the quantity of oil discharge may be regulated, an air pressure control device disposed between a source of compressed air and the oil retainer, pipe connections between the source of compressed air and the air pressure control device also between the air pressure control device and the oil retainer, a discharge pipe for each of the oil discharge mechanisms, and automatic means for intermittently actuating the functions of the air and oil discharge mechanisms.

In testimony whereof I affix my signature in the presence of two witnesses.

Seattle, Washington, May 21, 1917.

CHARLES FREDERICK HOOFER.

Witnesses:
    E. L. Proctor,
    E. E. Hoofer.